US011090576B2

(12) United States Patent
Schwartz et al.

(10) Patent No.: US 11,090,576 B2
(45) **Date of Patent: *Aug. 17, 2021**

(54) SPECIAL EFFECTS VISUALIZATION TECHNIQUES

(71) Applicant: Universal City Studios LLC, Universal City, CA (US)

(72) Inventors: Justin Schwartz, Orlando, FL (US); Clarisse Vamos, Orlando, FL (US); David Alter, Orlando, FL (US); Justin Hare, Orlando, FL (US); Ryan Paul, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/395,089

(22) Filed: Apr. 25, 2019

(65) Prior Publication Data

US 2020/0129878 A1 Apr. 30, 2020

Related U.S. Application Data

(60) Provisional application No. 62/752,216, filed on Oct. 29, 2018.

(51) Int. Cl.

| | |
|---|---|
| ***G06T 19/00*** | (2011.01) |
| ***H04N 9/31*** | (2006.01) |
| ***A63J 21/00*** | (2006.01) |
| ***A63J 5/02*** | (2006.01) |
| ***G06T 7/20*** | (2017.01) |

(52) U.S. Cl.

CPC ............... *A63J 21/00* (2013.01); *A63J 5/025* (2013.01); *G06T 7/20* (2013.01); *G06T 19/006* (2013.01); *H04N 9/3179* (2013.01); *G06T 2207/30196* (2013.01)

(58) Field of Classification Search

USPC ........................................... 348/14.01–14.09

See application file for complete search history.

(56) References Cited

U.S. PATENT DOCUMENTS

| | | | |
|---|---|---|---|
| 5,270,752 | A | 12/1993 | Kataoka et al. |
| 6,425,825 | B1 | 7/2002 | Sitrick |
| 7,555,147 | B2 | 6/2009 | Simmons |

(Continued)

FOREIGN PATENT DOCUMENTS

| | | |
|---|---|---|
| EP | 0583060 A2 | 7/1993 |
| GB | 2479522 A | 3/2010 |
| JP | H06110480 | 4/1994 |

OTHER PUBLICATIONS

PCT/US2019/047319 International Search Report and Written Opinion dated Nov. 26, 2019.

*Primary Examiner* — Maria El-Zoobi

(74) *Attorney, Agent, or Firm* — Fletcher Yoder, P.C.

(57) ABSTRACT

A method may include acquiring, via a capture system, a dataset associated with a user at a first location, detecting, via a control system, the user at a second location, displaying, via an environmental system, one or more images generated from the dataset at the second location in response to detecting the user at or past the second location, and triggering, via a special effect system, a special effect during the displaying at the second location in response to detecting the user at or past the second location. The dataset may include image data of the user.

25 Claims, 7 Drawing Sheets

100 130 116 124 106 120 126 114 104 108 102 118 128 111 115 112

(56) References Cited

U.S. PATENT DOCUMENTS

| | | | | |
|---|---|---|---|---|
| 8,537,154 | B2 | 9/2013 | Naito et al. | |
| 8,567,954 | B2 | 10/2013 | Koehler et al. | |
| 8,795,096 | B2 | 8/2014 | Stoker | |
| 2002/0122605 | A1* | 9/2002 | Chang | H04N 7/147 382/284 |
| 2004/0001182 | A1 | 1/2004 | Dyner | |
| 2008/0068443 | A1* | 3/2008 | Thielman | H04N 7/15 348/14.1 |
| 2009/0309955 | A1* | 12/2009 | Gladstone | H04M 3/42374 348/14.04 |
| 2012/0062799 | A1* | 3/2012 | Apostolopoulos | H04N 5/21 348/609 |
| 2013/0083024 | A1* | 4/2013 | Li | H04N 13/293 345/426 |
| 2013/0217487 | A1 | 8/2013 | Sledge et al. | |
| 2016/0269673 | A1 | 9/2016 | Crowder et al. | |
| 2017/0264863 | A1* | 9/2017 | Sakarya | H04N 13/388 |

* cited by examiner

SPECIAL EFFECTS VISUALIZATION TECHNIQUES

CROSS REFERENCE TO RELATED APPLICATIONS

This application claims priority to and the benefit of U.S. Provisional Application No. 62/752,216, entitled "Special Effects Visualization Techniques," filed Oct. 29, 2018, which is hereby incorporated by reference in its entirely for all purposes.

BACKGROUND

The present disclosure relates generally to special effects techniques, and, more specifically, to systems and methods for providing an immersive experience to users to simulate transportation of the users to another location.

Certain types of illusions create the effect of disappearing. The audience of a transportation illusion typically sees a performer disappear from view as the illusion is carried out. The audience may watch from afar as the performer is seemingly transported to a different location on a stage or in a building. The disappearance and emergence of the performer is timed for a single performance. However, the audience or individual members of the audience are typically not provided with an immersive experience of being transported to another location. Improved and more immersive viewing experiences are desirable.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In an embodiment, a special effects visualization system may have a capture system that generates a dataset associated with a user based on likeness data of the user at a first location, an environmental system that displays one or more images at a second location different from the first location, a special effects system that triggers a special effect at the second location, and a control system communicatively coupled to the capture system, the environmental system, and the special effects system. The control system may detect a presence of the user at the second location, and in response to detecting the presence of the user at the second location, transmit one or more control signals to the environmental system based on the dataset and transmit one or more additional control signals to the special effects system. The control signals may cause the environmental system to display the one or more images at the second location. The one or more images may be generated using the dataset. The additional control signals may cause the special effects system to trigger the special effect during display of the one or more images at the second location.

In another embodiment, a special effects visualization system may have a capture system that that acquires likeness data of a user at a first location and generates a dataset based on the likeness data, an environmental system that displays a three-dimensional (3D) presentation based on the dataset at a second location different from the first location, and a special effects system that triggers a special effect at the second location during the display of the 3D presentation. The 3D presentation may have a likeness of the user.

In yet another embodiment, A method may include acquiring, via a capture system, a dataset associated with a user at a first location, detecting, via a control system, the user at a second location, displaying, via an environmental system, one or more images generated from the dataset at the second location in response to detecting the user at or past the second location, and triggering, via a special effect system, a special effect during the displaying at the second location in response to detecting the user at or past the second location. The dataset may include image data of the user.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
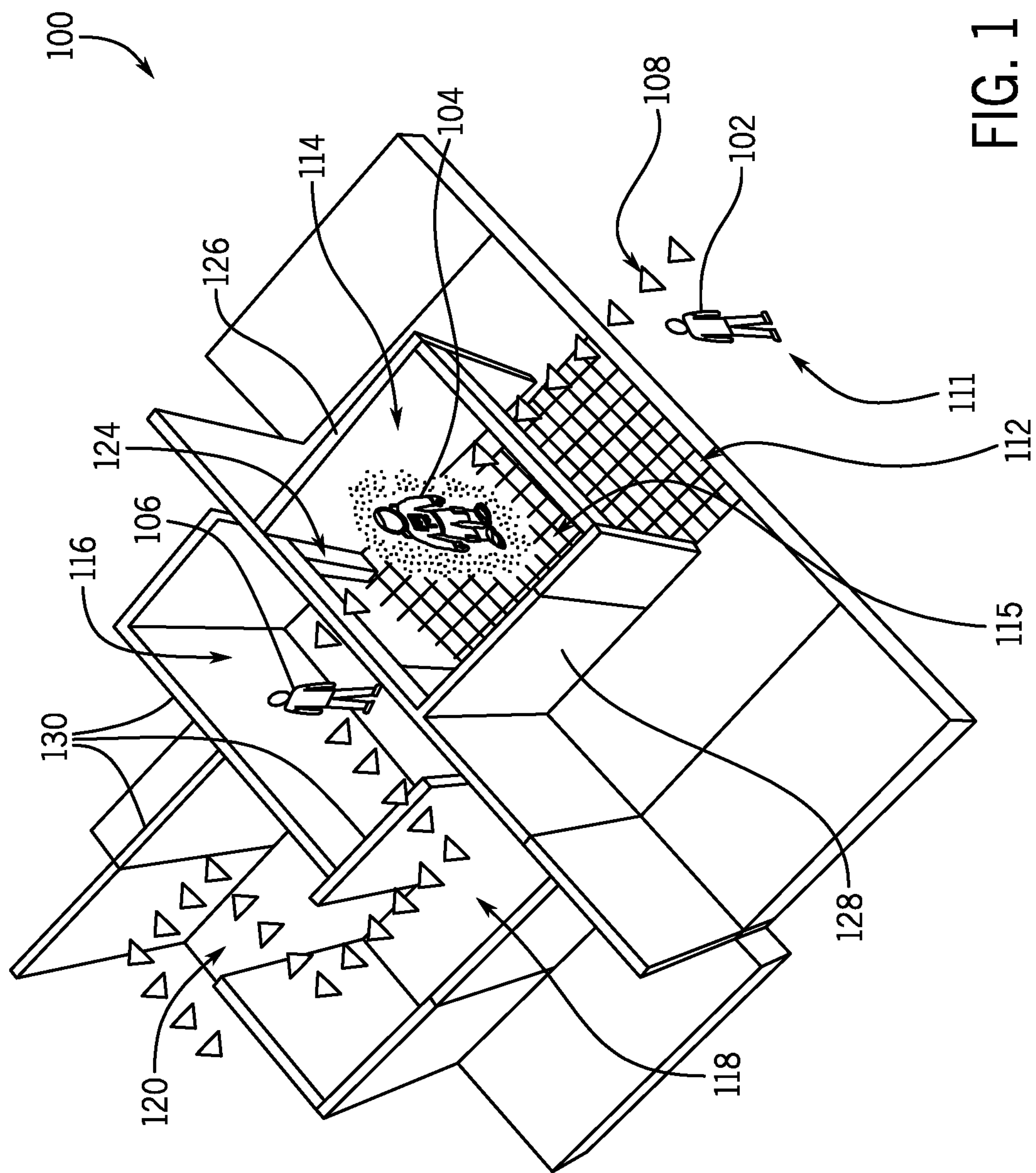
FIG. 1 is a schematic illustration of an exemplary embodiment of a pathway traveled by a user of a transportation illusion produced by a special effects visualization system and a position of a viewer of one or more special effects triggered by the special effects visualization along the pathway, in accordance with aspects of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions may be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The performance of a transportation illusion is typically enacted by a skilled or professional performer for an audience to view. The performer may simulate the transportation of the performer, an assistant, an inanimate object, or an animal to another location in view of the audience. However, the audience's limited participation in the performance leaves the audience as mere bystanders. Accordingly, it may be desirable to provide an immersive and/or transformative transportation illusion to the audience such that the audience may actively participate (e.g., as a user) in the transportation illusion and view another user's transportation illusion (e.g., as a viewer).

The present disclosure relates to systems and methods that utilize material actuation, sensor data, and/or special effects to enhance a user experience and a viewer experience with a transportation illusion. More particularly, the present disclosure relates to a special effects visualization system that includes an image capture (e.g., image, video, or spatial) and environmental display or projection system (e.g., fog screen or display, vapor screen or display, smoke screen or display, a cryogenic-based screen or display, a sand-based screen or display, or other particulate-based screen or display). In some embodiments, one or more components of the surrounding environment (e.g., walls, doors, ceiling, floor, objects within the environment, or the like) may also form part of the display of the transportation illusion. The image capture and environmental projection system may simulate (e.g., generate an illusion of) the transportation of a user away from the user's position. In one embodiment, for example, the capture and projection system may acquire image data of the user, capture a likeness of the user based on the image data, generate one or more special effects based on the likeness of the user, and trigger the special effects while displaying the likeness of the user in an environment to provide the transportation illusion associated with the user to any number of viewers. That is, a viewer may see the likeness of the user being transported away (e.g., the user disappearing). Additionally, the special effects visualization system may provide the user with one or more sensory stimulations to impart to the user a feeling that the user is being transported away to another location or that the user's environment is changing. For example, the special effects visualization system may trigger one or more types of environmental effects (e.g., olfactory, heat, wind, cold, haptics, or auditory) as the user walks along a pathway through the environment that provides the transportation illusion to both the viewer and any viewers in range. The environmental effects may provide the user with various sensory stimulations associated with a particular characteristic of the transportation illusion (e.g., disappearing into smoke or flames, dispersing into particles, or walking into a wormhole). Accordingly, the special effects visualization system may enhance the experience of the user and the experience of the viewer with the transportation illusion simultaneously (or substantially simultaneously) by providing an immersive and/or transformative experience to the user and the viewer. Further, by using likeness data of the user and user-triggered special effects, the experience is personalized and dynamic, in contrast to scripted or pre-recorded illusions.

In certain embodiments, the disclosed special effects visualization system is provided within a location-based entertainment venue, such as an amusement or theme park. Theme parks provide controlled environments that may be associated with memorable effects that enhance an immersive and/or transformative experience. That is, a particular attraction environment may have ice, fire, smoke, light, and other sensory thematic elements that are recreated at least in part for a user of the special effects visualization system to provide the user with a feeling of being transported from a first location to a second location. Accordingly, certain embodiments of the disclosure are disclosed in the context of special effects that are part of an entertainment narrative and that enhance an immersive and/or transformative entertainment experience for users or viewers. In one embodiment, a user may adopt a character associated with an attraction within the theme park, such as an astronaut having different physical features and operating in a fictional extra-planetary environment. Accordingly, the communication effects and the special effects are selected and operate in concert to enhance the desired narrative. It should be understood that the communication effects and the special effects may be selected to fit other narrative environments and that the depicted astronaut narrative is by way of example only.

As described herein, the "user" is referred to as the desired target of the transportation illusion. The likeness of the user is captured and displayed as part of the transportation illusion for viewers of the transportation illusion to see. In some embodiments, the user may not be able to view the user's own transportation illusion. Additionally, as described herein, the "viewer" is referred to as the desired audience of the transportation illusion. In some embodiments, the viewer is positioned at some distance away from the transportation illusion, e.g., in range, such that the viewer may see the transportation illusion but not the physical body of the user during at least a portion of the illusion event. Further, in some embodiments, the viewer may become a desired target of a subsequent transportation illusion such that the viewer becomes the user associated with the subsequent transportation illusion. In one embodiment, a user, a first viewer, and a second viewer may be in a line for an attraction at theme park. The user is first in line, the first viewer is second in line, and the second viewer is third in line. The user may be the desired target of a first transportation illusion while the first viewer and/or the second viewer may view the first transportation illusion. After the first transportation illusion is complete, the first viewer may transition into the role of the user (e.g., desired target) associated with the second transportation illusion while the second viewer may view the second transportation illusion, and so on and so forth. Additional details with regard to the roles of the user and the viewer during a particular transportation illusion and the transition between roles (e.g., from viewer to user) may be discussed below with reference to FIGS. 1-4.

Turning now to the drawings, FIG. 1 is a schematic illustration of an illusion environment 100 that may implement a transportation illusion as provided herein. The illusion environment 100 includes a pathway 108 traveled by a user 106 through the illusion environment 100 and, subsequently, by a viewer 102 of a transportation illusion 104 associated with the user 106 along the pathway 108. In the illustrated embodiment, the pathway 108 may include a first region 111 of the pathway 108 in which a viewer 102 may be positioned to view the transportation illusion 104 associated with the user 106. Although a single viewer 102 is illustrated as being positioned within the first region 111, it should be noted that any number of viewers 102 may be positioned within the first region 111 to view the transportation illusion 104 associated with the user 106.

Additionally, the pathway 108 may also include a second region 112, e.g., a transition region or an image capture region, through which the user 106 may move towards a third region 114, e.g., an illusion region, in which a special effects visualization system (see FIG. 4) provides the transportation illusion 104 to the viewer 102 in the first region 111. As provided herein, the viewer 102 may transition to the role of the user 106 after a preceding transportation illusion 104 has completed. During such a transition, the second region 112 may be associated with the region in which the transition between the role of the viewer 102 and the role of the user 106 occurs. For example, after a preceding transportation illusion 104 has completed, the viewer 102 may move through the second region 112 toward the third region 114. As the viewer 102 moves through the second region 112, the viewer 102 may transition into the role of the user 106 for a subsequent transportation illusion 104. For example, the special effects visualization system may acquire image data associated with the user 106 (e.g., previously the viewer 102). The special effects visualization system may subsequently use the image data to capture a likeness of the user 106 to effectuate a subsequent transportation illusion 104 in the third region 114 to an additional viewer 102 positioned within the first region 111. Additional details with regard to the acquisition of image data associated with the user 106 may be discussed below with reference to FIG. 4.

In some embodiments, the second region 112 and the third region 114 may overlap or be the same region. For example, the capture region of the user 106 and the region in which the transportation illusion 104 is provided may be the same region but at different location within the region.

As the user 106 travels through the third region 114, the special effects visualization system may trigger one or more environmental effects (e.g., olfactory, heat, wind, cold, haptics, or auditory) to provide the user 106 with various sensory stimulations associated with a particular characteristic of the transportation illusion 104 (e.g., disappearing into smoke or flames, dispersing into particles, or walking into a wormhole). That is, the special effects visualization system may provide the user 106 with a feeling that the environment is changing to enhance the illusion for the viewer 102 and to provide the illusion that the user 106 is being transported to another location as the user 106 travels through the third region 114. Additionally, the special effects visualization system may provide a transportation illusion 104 associated with the user 106 in the third region 114 as the user 106 travels through the third region 114. For example, the special effects visualization system may trigger one or more special effects and display a likeness of the user 106 in the third region to effectuate the transportation illusion 104 to the viewer 102 positioned in the first region 111. Additional details with regard to the triggered environmental effects, the triggered special effects, and the display of the likeness of the user 106 by the special effects visualization system may be discussed below with reference to FIGS. 4 and 5.

The transportation illusion 104 may occur at a position 115 in the third region 114 that is between the second region 112 and the real-time position of the user 106. That is, the transportation illusion 104 is triggered or initiated at a point in time when the user 106 has traveled along the pathway 108 past the position 115 of the transportation illusion 104 such that the actual user 106 does not overlap or interfere with the displayed likeness of the user 106 displayed as part of the illusion 104.

After the user 106 travels through the third region 114, the user 106 may pass into a fourth region 116 of the pathway 108. In some embodiments, the user 106 may pass through a moveable wall 124 move from the third region 114 to the fourth region 116. In one embodiment, the moveable wall 125 may include one or more doors that open or slide to allow the user 106 to travel into the fourth region 116. The doors may close or slide back into position after the user 106 has passed into the fourth region 116. In another embodiment, the moveable wall 125 may slide to the left or the right to allow a user 106 to travel into the fourth region 116. In another embodiment, the user 106 turns a corner or moves into another room or hallway to move into the fourth region 116. In any case, after the user 106 passes into the fourth region 116, the user may continue traveling along the pathway 108.

The passage of the user 106 from the third region 114 to the fourth region 116 facilitates the occlusion of the user 106 from the viewer 104 during and/or after the transportation illusion. Although FIG. 1 illustrates a moveable wall 124 to help facilitate the occlusion of the user 106, it should be noted that any other suitable means for preventing the viewer 102 from viewing the user 106 during and/or after the transportation illusion 104 may be utilized. For example, the user 106 may pass through a revolving door or wall (see FIG. 3), the user 106 may be lowered (see FIG. 2) or elevated by a platform, the user 106 may fall through a trap door, the moveable wall 126 may move backwards as the user 106 approaches it and another wall may be positioned behind the user 106, or any other suitable means for occluding the user 106 from the viewer 102.

As illustrated in FIG. 1, the pathway 108 may have additional regions, e.g., a fifth region 118, a sixth region 120, positioned after the fourth region 114 that the user 106 may travel through and forming other parts of the illusion environment 100. It should be noted, however, that in some embodiments, the pathway 108 may have any number of regions after the fourth region 116 that the user 106 may pass through. In some embodiments, the pathway 108 may also have any number of regions before the third region 114.

Each respective region 111, 112, 114, 116, 118, 120 may have one or more walls that at least partially define each region of the pathway 108. In the illustrated embodiment, for example, the third region 114 may have walls 126, 128 that partially enclose the third region 114 such that the focus of the viewer 102 may be directed toward the transportation illusion 104. The fourth region 116, the fifth region 118, and the sixth region 120 may also have one or more walls 130 that partially enclose each region. For example, walls 130 may help define the pathways 108 for the user 106 to travel through or may form other features of the illusion environment 100.

In some embodiments, various implements may be utilized to direct the viewer 102 to the pathway 108 and/or the user 106 away from the pathway 108. For example, an escalator, an elevator, a moving sidewalk, stairs, or another pathway may be implemented. In another embodiment, there may be nothing to direct the viewer 102 to the pathway and/the user 106 away from the pathway.

It should also be noted that the position of the viewer 102 of the transportation illusion 104 may not be limited to the first region 111. In some embodiments, the viewer 102 may be positioned in any region outside of the third region 114 in which the transportation illusion 104 occurs such that the viewer 102 may view the transportation illusion 104 but have an obstructed view of the physical body of the user 106.

Figure 2:
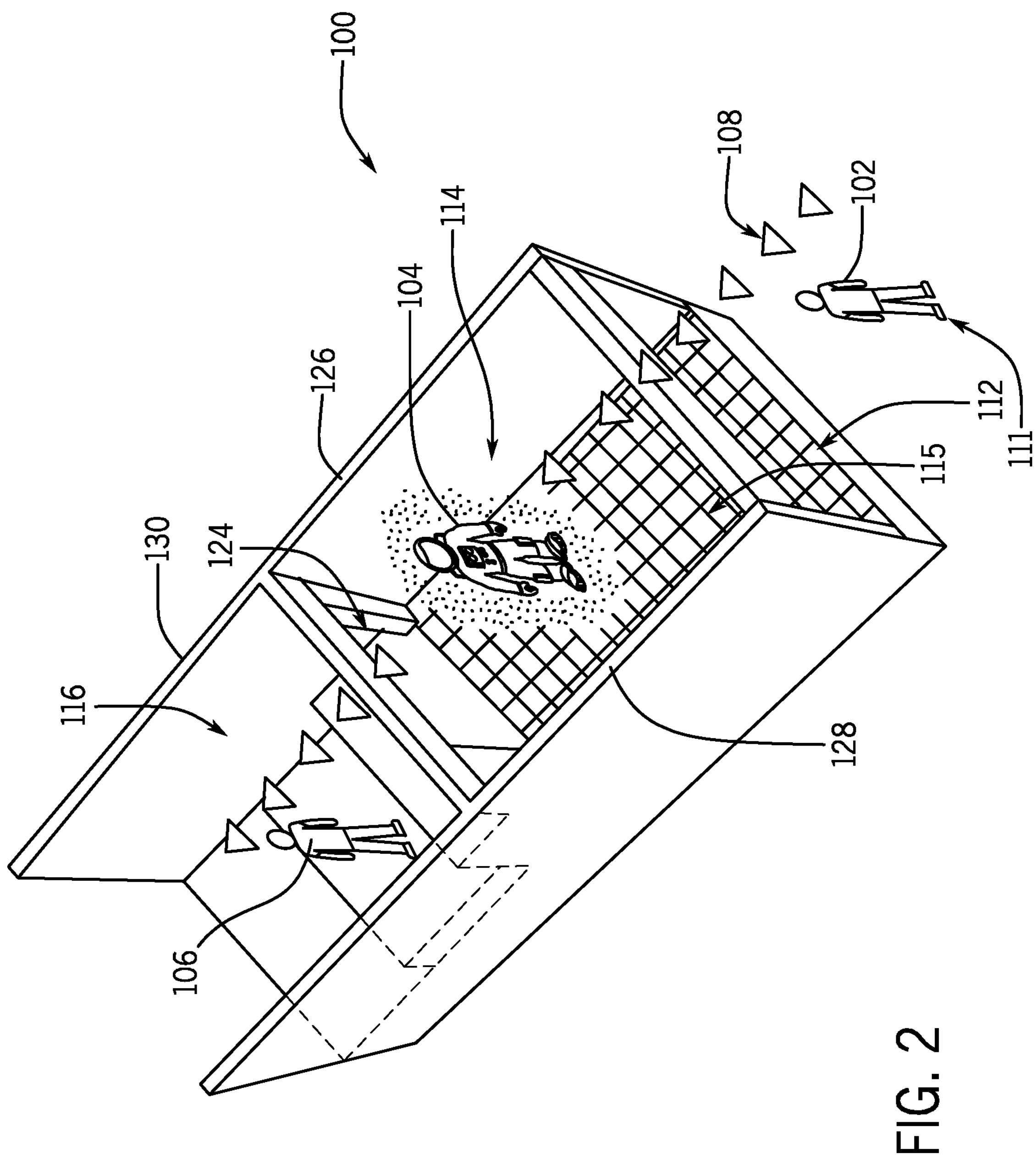
FIG. 2 is a schematic illustration of another exemplary embodiment of a pathway traveled by a user of a transportation illusion produced by a special effects visualization system, in accordance with aspects of the present disclosure.

FIG. 2 is a schematic illustration of another embodiment of the pathway 108 that the user 106 may travel and the transportation illusion 104 that may be produced by the special effects visualization system. The user 106 may be lowered to a passage in which the pathway 108 continues. As illustrated in FIG. 2, the user 106 may move to a platform in the fourth region 116. The platform may lower the user 106 such that the viewer 102 may not see the user 106 during and/or after the descent of the user 106. For example, the floor of the third region, the back wall of the fourth region, and other components of the environment of the pathway 108 may occlude the user 106 from the viewer 102.

Figure 3:
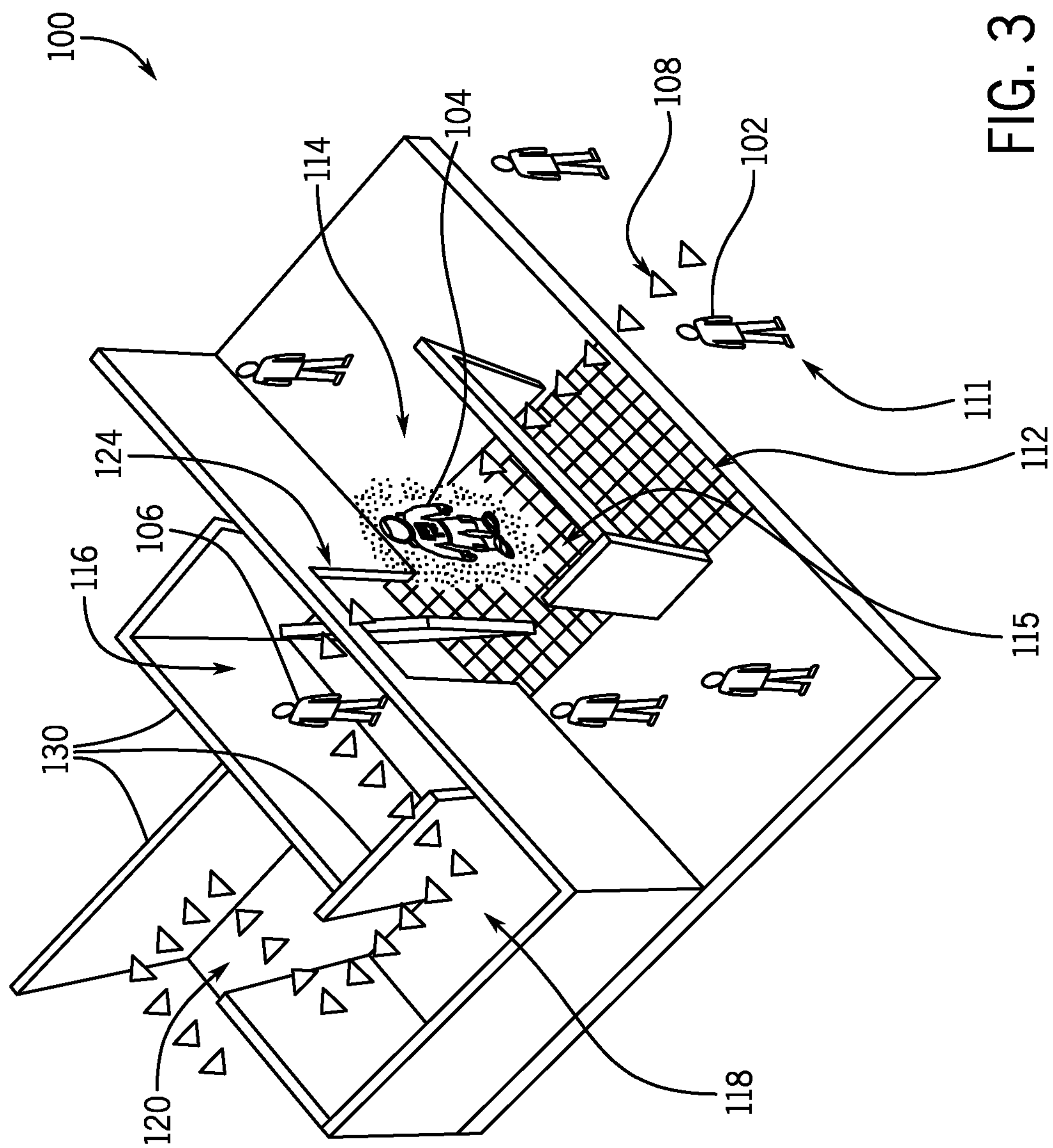
FIG. 3 is a schematic illustration of another exemplary embodiment of a pathway traveled by a user of a transportation illusion produced by a special effects visualization system and a position of multiple users of one or more special effects triggered by the special effects visualization along the pathway, in accordance with aspects of the present disclosure.

FIG. 3 is a schematic illustration of another embodiments of the pathway 108 that the user 106 may travel and the transportation illusion 104 that may be produced by the special effects visualization system. As illustrated in FIG. 3, there may be multiple viewers 102 that may view the transportation illusion 104 from various angles. The multiple viewers 102 may see the transportation illusion 104 but the view of the user 106 may be occluded by various components of the pathway environment (e.g., walls, doors, ceilings, floors, objects in the environment, or portions thereof). Additionally, the user 106 may pass through a revolving wall 124 to move from the third region 114 to the fourth region 116. The revolving wall 124 helps facilitate the occlusion of the user 106 from the multiple viewers 102 of the transportation illusion 104.

Although FIGS. 1-3 illustrate various configurations of the pathway 108, components (e.g., walls or floors) of the pathway environment, and various implements (e.g., moveable wall, revolving wall or door, platform) that facilitate the display of the teleportation illusion 104 and/or occlusion of the user 106 from the viewer 102, it should be noted that any other suitable configurations of the pathway 108, the components of the pathway environment, and the implements may be used to facilitate the display of the teleportation illusion 104 and/or occlusion of the user 106 from the viewer 102. For example, the pathway 108 may include any suitable number of turns, curves, elevation changes, or the like, to provide an immersive and/or transformative experience to the user 106 and/or the viewer.

Figure 4:
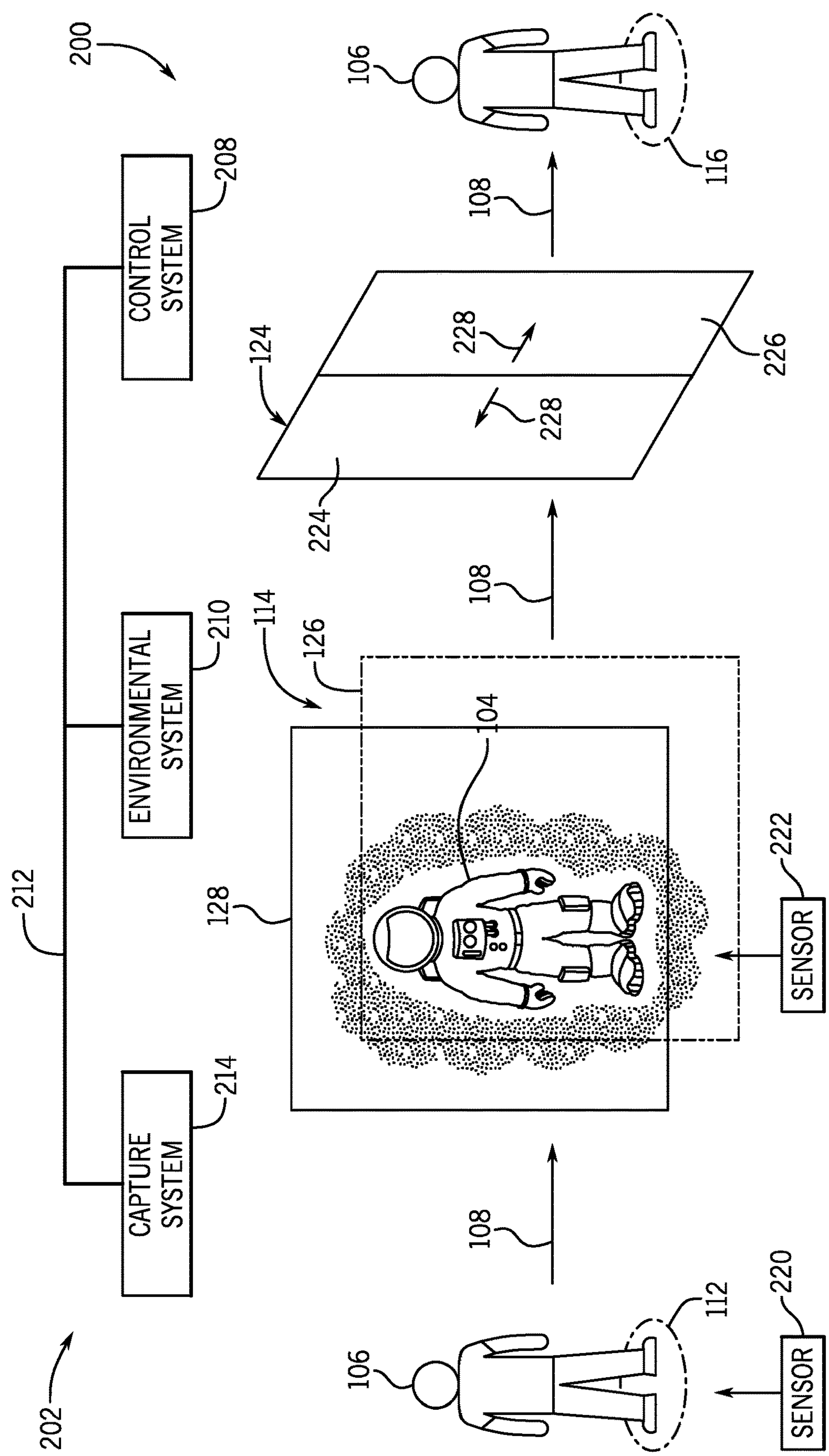
FIG. 4 is an illustration of an exemplary embodiment of a special effects visualization system configured to capture a likeness of a user and display one or more special effects based on the likeness of the user as the user travels along a pathway, in accordance with aspects of the present disclosure.

FIG. 4 is an illustration 200 of an exemplary embodiment of a special effects visualization system 202 that may be implemented with the illusion environment 100 of FIG. 1 and that is configured to capture the likeness of the user 106 and provide a transportation illusion 104 based on the likeness of the user 106 as the user 106 travels along the pathway 108. In the illustrated embodiment, the special effects visualization system 202 may include a control system 208, an environmental system 210, and a capture system 214 that communicate via a communications network 212. Datasets (e.g., audio data, image data, spatial data, or sensor data) may be transmitted between components of the special effects visualization system 202 via the communications network 212. The communications network 212 may include any number of input/output (I/O) interfaces and/or network interfaces. The communications network may enable data transmission over a variety of wired or wireless networks such as personal area network (PAN), Bluetooth, a local area network (LAN) or wireless local area network (WLAN) such as Wi-Fi, and/or for a wide area network (WAN) such as a cellular network.

The capture system 214 of the special effects visualization system 202 may acquire image data associated with the user 106 in the second region 112 of the pathway 108. The capture system 214 may include one or more cameras to acquire image data associated with the user 106. For example, the cameras may include one or more two-dimensional (2D) cameras, one or more three-dimensional (3D) cameras, a video camera, one or more infrared (IR) cameras, one or more depth cameras, or any other suitable image-receiving device in place of, or in addition to, the cameras to facilitate acquisition of the image data associated with the user 106. In one embodiment, a camera may be positioned above and ahead of the user 106. In another embodiment, two or more cameras may be positioned at various points around the user 106 in the second region 112. In yet another embodiment, two or more cameras may be positioned on a moving track such that the cameras may acquire image data from various angles as the user 106 moves through the second region 112. In any case, the capture system 214 may acquire an image data set associated with the user 106. In some embodiments, the image data set may include motion data, heat data, volumetric data, shape data, spatial data, visual data, or any other suitable data associated with the user 106 that may be used to capture a visual likeness of the user 106.

In the illustrated embodiment, the capture system 214 may acquire the image data associated with the user after a second region sensor 220 has detected the presence of the user 106 in the second region 112 of the pathway 108. In some embodiments, the sensor 220 may include one or more ultrasonic sensors, one or more light sensors, one or more pressure sensors, one or more thermal sensors, one or more IR sensors, one or more piezoelectric sensors, or any other suitable type of sensor for detecting the presence of the user 106 in the second region.

In some embodiments, the capture system 214 may be positioned in an area other than the second region 112 of the pathway 108. For example, the capture system 214 may be positioned in any suitable area before the third region 114 in which the transportation illusion 104 is provided to a viewer. In one embodiment, the capture system 214 may acquire an image data set associated with the user 106 at some predetermined time or location before the user 106 has traveled to the second region 112 of the pathway 108. The image data set may be stored in a database communicatively coupled to the capture system 214. In such an embodiment, the capture system 214 may then acquire image data associated with the user 106, for example, when the user 106 travels through the second region 112. In some embodiments, the acquired image data may only correspond to a subset of the stored imaged data set. For example, the capture system 214 may determine one or more user characteristics in the acquired image data that the capture system 214 (or the database) may use to determine a match to a stored image data sets in the database. After determining a match between the acquired image data and a stored image data set, the capture system 214 may receive the matching stored image data set from the database for use in effectuating the transportation illusion 104.

After the capture system 214 has acquired the image dataset associated with the user 106, the capture system 214 may capture a visual likeness of the user 106 based on the image dataset associated with the user. The visual likeness of the user 106 captured by the capture system 214 may include any suitable digital data and/or analog data to communicate a visage and/or presence of the user 106, including, but not limited to, image data, sensor data, or the like. In this manner, the capture system 214 may transmit a dataset indicative of the visual likeness of the user 106 to any component of the special effects visualization system 202 for further use.

In one embodiment, the displayed likeness may present a rear or back image of the user 106 to the viewers to provide the illusion 104 that the user 106 is undergoing transportation while moving along the pathway 108. For example, if the captured image shows a user 106 wearing a hat or backpack, the displayed likeness uses the portion of the image data to generated displayed images to show the backpack. In another embodiment, the displayed image or images may show a user front, generated from the image data, showing the user's face as if the user 106 were turned to face the viewers. In this manner, a family group may view recognizable family members going through the illusion.

In some embodiments, the capture system 214 may modify the image dataset associated with the user 106 to finalize the visual likeness of the user 106. For example, the user 106 may have been in an undesirable orientation or position (e.g., head at a downward angle) when the capture system 214 was acquiring the image dataset associated with the user 106. The capture system 214 may apply one or more algorithms to process the dataset such that the capture system 214 may subsequently acquire a proper visual likeness of the user 106 for use in the illusion environment 100.

The environmental system 210 of the special effects visualization system 202 may receive a dataset indicative of the likeness of the user 106 from the capture system 214 and display, or otherwise communicate, the transportation illusion 104 based on the likeness of the user 106 in the third region 114. In the illustrated embodiment, the environmental system 210 may display the transportation illusion 104 in the third region 114 between walls 126, 128. However, in some embodiments, the third region 114 may not be defined by any walls or may be defined by any other suitable number of walls.

The environmental system 210 may operate to present or display one or more images that are generated based on the dataset to display or otherwise communicate the likeness of the user 106 to a viewer of the transportation illusion 104. Additionally, the images associated with the likeness of the user 106 may be presented in concert with one or more supporting special effects to effectuate the transportation illusion 104 in the third region 114.

Further, the environmental system 210 may process or change the visual likeness of the user 106 to provide the transportation illusion 104 to the viewers. For example, images may present features of the user's face that are transformed (e.g., stretched or fading away at the edges) to enhance an illusion that the user 106 is being transported into wormhole. In another example, the image may present features of user's body turning into particles to enhance an illusion that the user 106 is being transported by dispersing into the particles. In other embodiments, the displayed image may be based on extracted identifiable (e.g., facial) features from the user 106. The environmental system 210 may incorporate these extracted features into a desired character avatar (e.g., a character from a narrative) that resembles the user 106. Certain character avatars may be associated with particular special effects, such as appearing/disappearing in a puff of smoke, and the combination of the display of the image of the avatar and the triggering of the special effect (e.g., release of smoke around a projection) may enhance certain narrative features of the communication. In the illustrated embodiment, the user 106 is rendered or presented as an astronaut.

The environmental system 210 may display, or otherwise communicate, the transportation illusion 104 based on the likeness of the user 106 after a third region sensor 222 has detected the presence of the user 106 in the third region 114 of the pathway 108. In some embodiments, the sensor 220 may include one or more thermal sensors, one or more IR sensors, one or more piezoelectric sensors, or any other suitable type of sensor for detecting the presence of the user 106 in the third region.

After the user 106 has traveled to the fourth region 116, the environmental system 210 may cease displaying the transportation illusion 104. In one embodiment, the third region sensor 222 may continuously operate to detect the presence of the user 106 in the third region 114. After the third region sensor 222 no longer detects the presence of the user 106 in the third region 114, the environmental system 210 may cease displaying the transportation illusion 104. In another embodiment, the environmental system 210 may cease displaying the transportation illusion 104 after a predetermined and/or configurable amount of time has passed. For example, the capture system 214 may determine a rate of movement associated with the user 106 along the pathway 108 based on the image data associated with the user 106. The environmental system 210 may receive the rate of movement associated with the user 106 from the capture system 214 and determine a suitable period of time in which to display the transportation illusion based on the rate of movement.

In the illustrated embodiment, a moveable wall 124 may define a portion of the third region 114 (e.g., along with walls 126, 128) and/or act as a projection surface for the display of the transportation illusion 104. As the user 106 approaches the moveable wall 124, the control system 208 of the special effects visualization system 202 may send a control signal to one or more actuators associated with the moveable wall 124 to slide a left portion 224 and a right portion 226 in a respective direction 228 to allow the user 106 to pass through the moveable wall 124 to the fourth region 116. In one embodiment, the control system 208 may send a control signal to the actuators associated with the moveable wall 124 to slide or open only one portion 224, 226 of the moveable wall 124 to allow the user 106 to pass through. In another embodiment, the control system 208 may send a control signal to the actuators associated with the moveable wall 124 to slide or open the entire moveable wall 124 to allow the user 106 to pass through.

Figure 5:
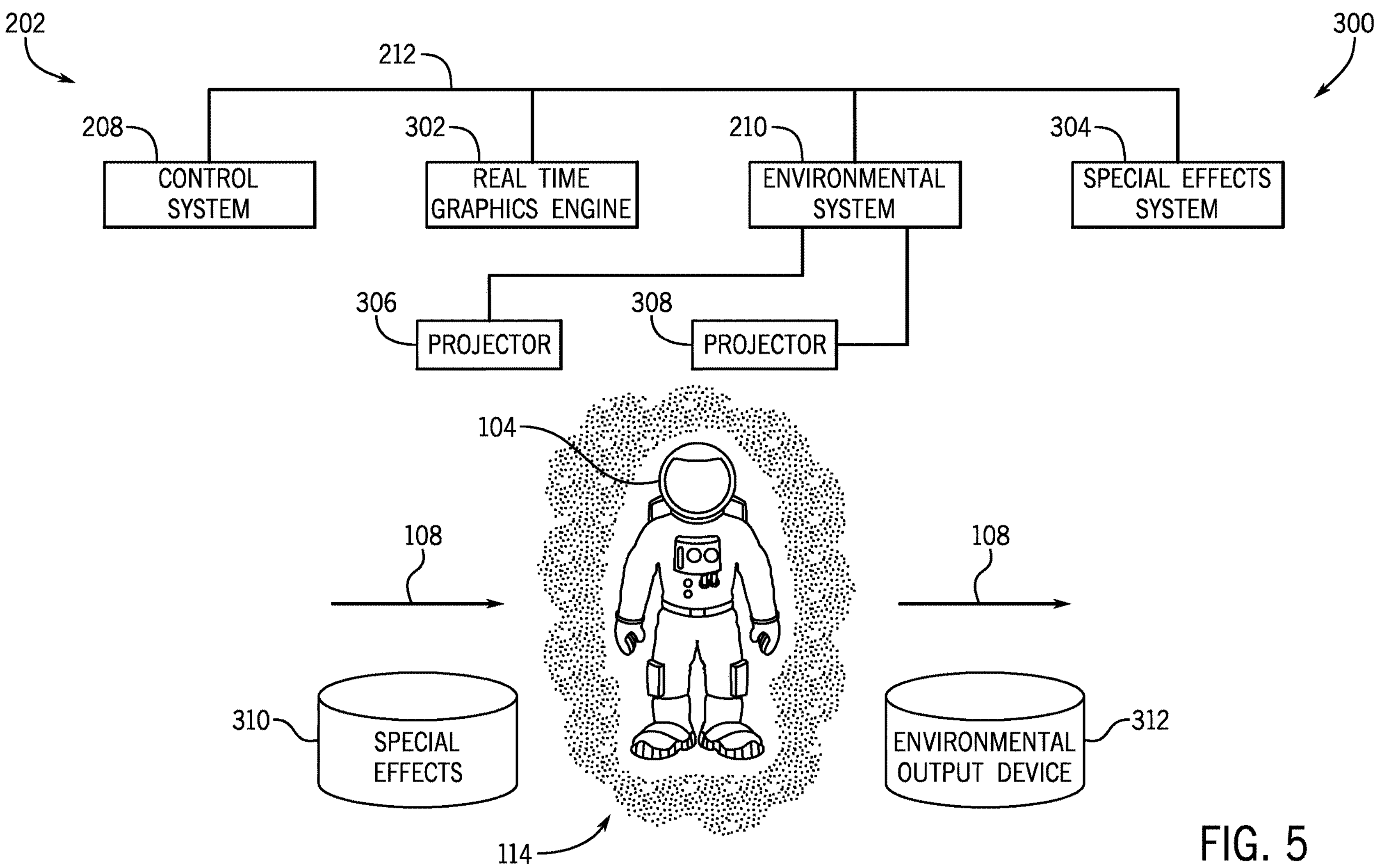
FIG. 5 is an illustration of an exemplary embodiment of a portion of the special effects visualization system of FIG. 2 configured to display the one or more special effects based on the likeness of the user as the user travels along a pathway, in accordance with aspects of the present disclosure.

FIG. 5 is an illustration 300 of an exemplary embodiment of the special effects visualization system 202 that may display, or otherwise communicate, the transportation illusion 104 based on the visual likeness of the user in the third region 114 of the pathway 108. In the illustrated embodiment, the special effects visualization system 202 includes the control system 208, the environmental system 210, a real time graphics engine 302, and a special effects system 304 that may communicate via the communications network 212.

As described above, the environmental system 210 may receive a dataset of image data indicative of the visual likeness of the user 106 after the user moves from the second region of the pathway 108 to the third region 114 of the pathway 108. In the illustrated embodiment, the environmental system 210 may receive the dataset from the real time graphics engine 302 after the real time graphics engine 302 has processed the dataset. For example, the real time graphics engine 302 may include memory circuitry and processing circuitry to alter, process, modify, adjust, or the like, the dataset before transmitting the dataset to the environmental system 210. The dataset may include a variety of suitable metadata, such as an illusion identifier or the like, to facilitate the processing of the dataset to provide an immersive and/or transformative experience to the user and/or the viewer. For example, the real time graphics engine 302 may process the dataset indicative of the visual likeness of the user based on the illusion identifier to modify the dataset to correspond to a desired narrative associated with the user, such as an astronaut traveling through a wormhole. The real time graphics engine 302 may then transmit the modified dataset to the environmental system to display, or otherwise communicate, the transportation illusion 104 in the third region 114 based on the modified dataset. The dataset and/or the modified dataset may be used to generate one or more images that are presented or displayed as part of the transportation illusion 104.

In some embodiments, the real time graphics engine 302 may generate data associated with providing a 3D likeness of the user based on the received dataset indicative of the likeness of the user. For example, the real time graphics engine 302 may receive volumetric data, depth data, shape data, spatial data, visual data, or the like from the capture system and modify the received dataset indicative of the visual likeness of the user to provide a 3D likeness of the user. In other embodiments, the dataset may already be indicative of a 3D likeness of the user after being processed by the capture system.

The environmental system 210 may then display, or otherwise communicate, the transportation illusion 104 based on the dataset indicative of the visual likeness of the user 106 in the third region 114. In the illustrated embodiment, the environmental system 210 includes one or more projectors, e.g., projectors 306, 308, and environmental output device 312. Based on the dataset indicative of the visual likeness of the user 106, the environmental system 210 may generate and transmit one or more control signals to the environmental output device 312 to provide a physical material to the third region 114. For example, the physical material may form a projection screen (e.g., a projection medium) that the environmental system 210 may display, or otherwise communicate, the transportation illusion 104 upon. In some embodiments, the projection screen (and the physical material) or surface may consist of fog, water, smoke, sand, ice, cryogenic materials, such as liquid nitrogen, liquid oxygen, and carbon dioxide, or any other suitable particulate materials. Although the transportation illusion 104 is described herein as an image projection onto a physical material screen (e.g., a fog screen, a water screen, a smoke screen, a cryogenic-based screen or display, a sand-based screen or display, or other particulate-based screen or display), as will be appreciated, any suitable projection or presentation technique may be used to provide the transportation illusion 104 involving the visual likeness of the user via the special effects visualization system 202. For example, the projector or projectors may project an illusion onto a wall or traditional display screen.

In some embodiments, components of the environment of the third region 114 may also be utilized as part of the projection medium. For example, walls, doors, a ceiling, a floor, one or more objects within the environment or the third region, or a portion thereof, may form a part of the projection medium. Accordingly, in such embodiments, the environmental system 210 may present the transportation illusion 104 associated with the user 106 on the projection screen or medium, any objects in the environment in which the teleportation illusion 104 is displayed, components of the environment in which the teleportation illusion 104 is displayed, or a combination thereof.

The environmental system 210 may also generate and transmit one or more control signals to the projector (e.g., projectors 306, 308) to present one or more images based on the dataset indicative of the visual likeness of the user. For example, the images may provide the transportation illusion 104 associated with the user to one or more viewers. That is, the viewer may see the visual likeness of the user being transported away from the third region 114.

It should be noted that the projectors 306, 308 may include one or more digital light processing (DLP) projectors, one or more liquid crystal display (LCD) projectors, one or more 3D projectors, or any other suitable image-displaying device in place of, or in addition to, the projectors 306, 308 to facilitate display of the transportation illusion 104 associated with the user 106. In one embodiment, the projectors 306, 308 may be positioned above the third region 114 of the pathway 108. In another embodiment, the projectors 306, 308 may include three projectors, four projectors, or any other suitable number of projectors to facilitate display of the transportation illusion 104 associated with the user 106. The control signals transmitted by the environmental signals to the projectors may control pixels, projection systems, or the like to permit the presentation of the visual likeness of the user into, onto, or out of any suitable physical material or light.

In some embodiments, the environmental system 210 may transmit control signals to the projectors 306, 308 to simulate the transportation of the user from the third region 114 of the pathway 108. The transportation illusion 104 may include a 2D or a 3D representation of the visual likeness of the user. For example, the transportation illusion 104 may include one or more images that present features of the user's face and/or body, modified features of the user's face and/or body, a body silhouette, or various transformations associated with a desired narrative associated with the transportation illusion 104. The modified features of the user's face and/or body may include the user's face and/or body being transformed (e.g., stretched, warped, or faded away) to enhance an illusion that the user is being transported into wormhole or the user's face and/or body turning into particles to enhance an illusion that the user is being transported by dispersing into the particles. It should be noted that any other suitable modification to the visual likeness of the user's face and/or body may be utilized to enhance the transportation illusion 104 associated with the user 106. Additionally, the various animations or displayed images associated with a desired narrative may include visual effects to enhance the transportation illusion 104, such as an animation of a wormhole, a portal, smoke, flames, particles, or any other suitable visual effect associated with the desired narrative.

Additionally, the images associated with transportation illusion 104 may be presented in concert with one or more special effects 310 (e.g., sensory effects) to impart to the user a sensation that the user is being transported away to another location. That is, the special effects 310 or sensory effects may provide the user with various sensory stimulations associated with a particular characteristic of the transportation illusion (e.g., disappearing into smoke or flames, dispersing into particles, or walking into a wormhole). For example, the special effects system 304 may trigger one or more types of special effects 310 or sensory effects (e.g., olfactory, heat, wind, cold, haptics, or auditory) as the user walks through the third region 114 of the pathway 108 simultaneously or substantially simultaneously with the presentation of the transportation illusion 104. In one embodiment, the special effects system 304 may receive the metadata associated with dataset indicative of the likeness of the user. For example, the special effects system 304 may receive an illusion identifier and trigger one or more special effects 310 or sensory effects based on the received illusion identifier.

In some embodiments, the special effects system 304 may trigger one or more special effects 310 or sensory effects based on a desired narrative associated with the user. For example, the special effects system 304 may release a burning smell or emit a heat or smoke effect with regard to a narrative in which the user is being transported via a burst of flames or smoke. In another example, the special effects system 304 may produce the sound of thunder with regard to a narrative in which the user is being transported in a lightning bolt. In any case, the special effects system 304 may provide any suitable special effects 310 or sensory effects based on the transportation illusion 104 associated with the user.

Accordingly, the special effects visualization system 202 may simultaneously (or substantially simultaneously) enhance the experience of the user and the experience of the viewer with the transportation illusion by providing an immersive and/or transformative experience to both the user and the viewer. That is, while a viewer is seeing the likeness of the user being transported in a transportation illusion 104 in the third region 114 of the pathway 108, the user may experience a feeling of a changing environment to enhance an illusion of being transported away via one or more sensory stimulations associated with the transportation illusion 104.

Figure 6:
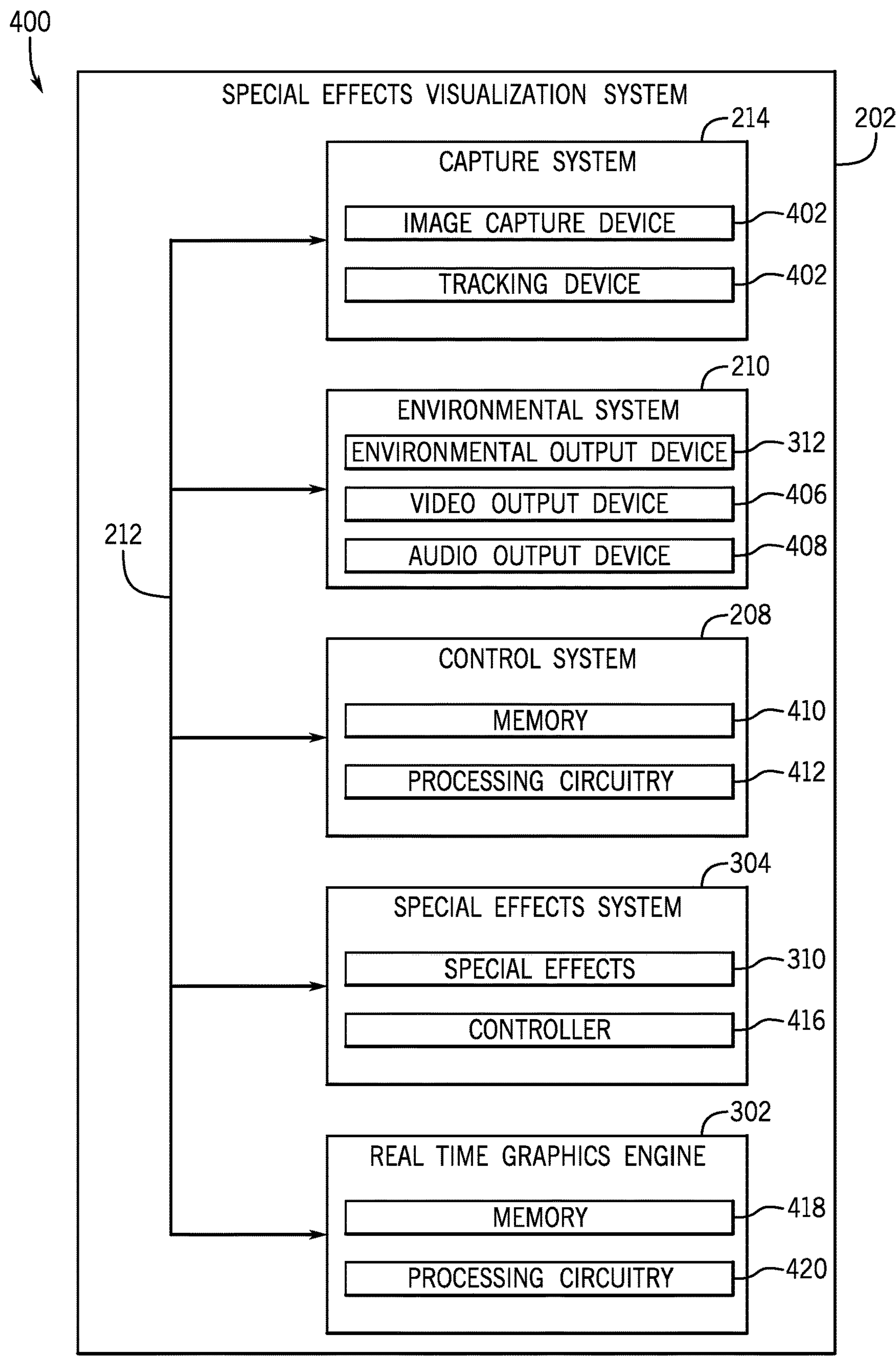
FIG. 6 is an exemplary embodiment of the special effects visualization system of FIG. 1, in accordance with aspects of the present disclosure.

With the foregoing in mind, FIG. 6 is an exemplary embodiment of a block diagram 400 of the special effects visualization system 202. The special effects visualization system 202 may include the control system 208, the environmental system 210, the capture system 214, the real time graphics engine 302, and the special effects system 304. As described above, each component 208, 210, 214, 302, 304 of the special effects visualization system may communicate with each other via the communication network 212.

The real time graphics engine 302 and the control system 208 may include respective memory circuitry 410, 418 and respective processing circuitry 412, 420 to process one or more datasets communicated between various components 208, 210, 214, 302, 304 of the special effects visualization system 202. The processing circuitry 412, 420 may be used to run programs, execute instructions, interpret input, generate control signals, and/or other similar functions, and may include a combination of hardware-based and/or software-based functions or applications to do so. The memory circuitry 410, 418 may be used to store data, programs, instructions, diagnostic data and final data, and so forth, in a variety of suitable memory or storage types, such as random-access memory, read-only memory, flash memory, a hard drive, future storage technologies both known and unknown at the current time (e.g., data storage on deoxyribonucleic acid (DNA)), and so forth.

Datasets (e.g., audio data, image data, spatial data, and additional sensor data) may be transmitted between the components 208, 210, 214, 302, 304 via the communications network 212. The communications network 212 may include any number of input/output (I/O) interfaces and/or network interfaces. The communications network 212 may enable data transmission over a variety of wired or wireless networks. In this way, the datasets may be recorded or sensed in an analog or digital domain and transmitted between the components 208, 210, 214, 302, 304 of special effects visualization system 202 in an analog or digital domain, or any combination thereof.

The control system 208 may operate the capture system 214, the environmental system 210, and the special effects system 304 to provide an immersive and/or transformative experience associated with the transportation illusion to the user and the viewer. In this way, the control system 208 may generate one or more control signals to respectively control various functions of the capture system 214, the environmental system 210, and the special effects system 304. For example, the control system 208 may transmit one or more control signals to the special effects system 304 to trigger one or more special effects based at least in part on the control signals.

As described above, the capture system 214 may acquire an image dataset associated with the user and capture a visual likeness of the user. The control system 208 may transmit one or more control signals to an image capture device 402 to acquire the image dataset associated with the user. For example, the image capture device may include one or more cameras as described herein. After capturing a visual likeness of the user, the capture system may transmit a dataset of image data indicative of the visual likeness of the user to other components (e.g., 210, 302, 304) of the special effects visualization system 202 via the communication network 212.

The environmental system 210 may receive the dataset indicative of the likeness of the user from the capture system 214 and/or the real time graphics engine 302 and display, or otherwise communicate, the transportation illusion based on the likeness of the user. The control system 208 may transmit one or more control signals to the environmental output device 312 to provide a projection screen consisting of a physical material (e.g., fog, water, smoke, sand, ice, or cryogenic materials). The control system 208 may also transmit one or more control signals to a video output device 406 (e.g., projectors) to display the transportation illusion on the projection screen provided by the environmental output device 312. Additionally, the control system 208 may transmit one or more control signals to an audio output device 408 (e.g., speakers, tactile transducer, or other suitable device) to provide one or more sounds associated with the transportation illusion to the user and/or the viewer. In some embodiments, the control signals may be generated by sub-components of the environmental system 210, such as driving circuitry responsive to the received dataset indicative of the visual likeness of the user. The environmental output device 312, the video output device 406, and the audio output device 408 may be controlled by the control system 208 simultaneously or substantially simultaneously to display, or otherwise communicate, the transportation illusion.

The special effects system 304 may trigger one or more types of special effects 310 or sensory effects (e.g., olfactory, heat, wind, cold, haptics, or auditory) based on a desired narrative associated with the user. The control system 208 may transmit one or more control signals to the special effect system 304 to provide a special effect or a sensory effect to the user such that the user may feel as if they are being transported from the position of the user. In this way, the special effect or the sensory effect may facilitate providing an immersive and/or transformative experience with the transportation illusion to the user. The special effect system 304 may include one or more special effects 310 (e.g., sensor effects) and a controller 416. The controller 416 may actuate or control components, such as valves, actuators, levers, or the like, to generate the special effect 310. For example, the controller 416 may release a burning smell, emit heat, produce the sound of thunder, produce a series of vibrations, or the like, based on a desired narrative associated with the transportation illusion of the user. In some embodiments, the special effect 310 may be triggered at an entrance or an exit to a room.

In some embodiments, the control system 208 may control a tracking device 404 of the capture system 214 that monitors the position of the user along the pathway and transmit one or more control signals to the capture system 214, the environmental system 210, and/or the special effects system 304 when the user is in appropriate position to perform one or more of each component's operations as described herein. For example, the tracking device 404 may detect a position of the user in the second region of the pathway and transmit a positional dataset associated with the user to the control system. Based on the positional dataset, the control system 208 may transmit one or more control signals to the capture system 214 to acquire image data of the user. In some embodiments, the tracking device 404 may transmit the positional dataset directly to the capture system 214. In another example, the tracking device 404 may detect a position of the user in the third region and transmit a positional dataset associated with the user to the control system. Based on the positional dataset, the control system 208 may transmit one or more control signals to the environmental system 210 and/or the special effects system 304 to activate one or more components of the transportation illusion based on the position of the user. In one embodiments, the special effects system 304 may increase the intensity of the special effects (e.g., vibrations) provided to the user as the user moves closer to the fourth region of the pathway (e.g., to make the user feel as though the user had initially been pulled into a wormhole and is now fully being transported in the wormhole). In some embodiments, the control system 214 and/or the real time graphics engine 302 may modify the dataset based on the tracked position of the user.

As may be appreciated, intensive processing may be used to provide an immersive and/or transformative experience with the transportation illusion to the user and the viewer. The real time graphics engine 302 and the control system 208 may include respective processing circuitry 412, 420 to process one or more datasets communicated between components 208, 210, 214, 302, 304 of the special effects visualization system 202. In this way, some or all of the processing of the one or more datasets may be shared between the control system 208 and the real time graphics engine 302. Processing of the datasets may happen while data transmission continues. In this way, datasets may be used to generate control signals in real-time (e.g., to cause a special effect or to drive presentation of the transportation illusion associated with the user).

Figure 7:
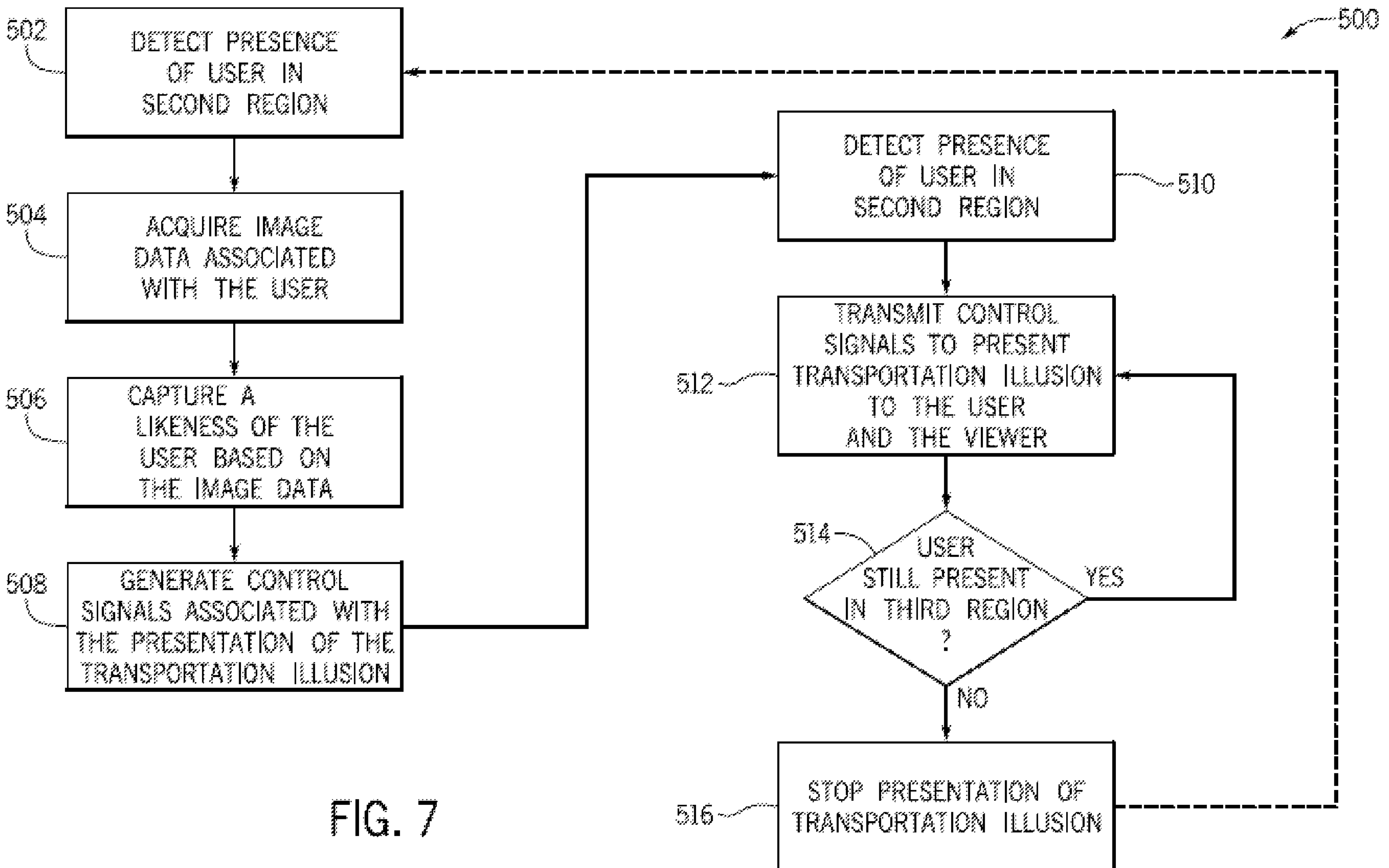
FIG. 7 is a flow diagram of a process for providing an immersive and/or transformative visualization system, in accordance with aspects of the present disclosure.

FIG. 7 is a flow diagram of a process 500 for providing an immersive and/or transformative experience with the transportation illusion to the user and/or the viewer. Although the process 500 is described below as being performed by the control system 208 of the special effects visualization system 202, it should be understood that the process 500 may be performed by any component 210, 214, 302, 304 of the special effects visualization system 202 as provided herein. Moreover, although the following description of the process 500 is described in a particular order, it should be noted that the process 500 may be performed in any suitable order.

At block 502, the control system 208 may detect the presence of the user in second region of the walkway. The control system 208 may detect the user in response to data received from one or more sensors indicating that the user, or a portion thereof, has entered the second region of the walkway. In some embodiments, the control system 208 may detect a user after receiving an initiation input from a computing device associated with the user and/or via an input device associated with the special effects visualization system 202. The initiation input may indicate to the control system 208 to being acquiring image data associated with the user. Furthermore, the control system 208 may transmit one or more initiation inputs to the other components 210, 302, 304 of the special effects visualization system 202.

At block 504, the control system 208 may transmit one or more control signals to the capture system 214 to acquire image data associated with the user. In some embodiments, the image data may include motion data, heat data, volumetric data, shape data, spatial data, visual data, or any other suitable data associated with the user. As the user travels through a second region of the walkway, the capture system 214 may acquire image data of the user such that a 2D representation or a 3D representation of the user may be generated based on the image data.

At block 506, after the image data associated with the user has been acquired, the control system 208 may transmit one or more control signals to the capture system 214 to capture a visual likeness of the user based on the image data. For example, the capture system 214 may determine a 2D representation or a 3D representation of the user based on the image data. In some embodiments, after the image data associated with the user has been acquired, the capture system 214 may automatically process the image data to determine a visual likeness of the user. In any case, after the capture system 214 has acquired a visual likeness of the user, the capture system 214 may transmit a dataset indicative of the visual likeness of the user 106 to control system 208, the environmental system 210, the real time graphics engine 302, and/or the special effects system 304.

At block 508, the control system 208 may transmit one or more control signals to the environmental system 210, the real time graphics engine 302, and/or the special effects system 304 to generate one or more control signals associated with the presentation of the transportation illusion to the user and/or the viewer. For example, the environmental system may generate one or more control signals to display the transportation illusion associated with the user based on the dataset indicative of the visual likeness of the user. In some embodiments, the real time graphics engine 302 may process the dataset indicative of the visual likeness of the user based on an illusion identifier to modify the dataset to correspond to a desired narrative associated with the user (e.g., an astronaut traveling through a wormhole) before transmitting the dataset to the environmental system 210.

The special effects system 304 may also generate one or more control signals based on the dataset indicative of the visual likeness of the user to trigger one or more special effects or sensory effects. For example, the special effects system 304 may receive an illusion identifier with the dataset and generate the control signals based on the illusion identifier. For example, the special effects system 304 may generate a control signal to release a burning smell and/or emit heat based on a narrative in which the user is transported, leaving smoke or flames. In any case, the special effects system 304 may generate one or more control signals to provide any suitable special effects 310 or sensory effects based on the transportation illusion associated with the user.

In some embodiments, the control system 208 of the special effects visualization system 202 may receive a selection of a narrative associated with the transportation illusion. The selection of the narrative may be received via user input device, such as a dial, a voice control, a touchpad, a button, a graphical, spatial, and/or physical user interface presented on a display device, or the like. In one embodiment, the control system 208 may receive the selection before the user enters the second region of the pathway. In another embodiment, the control system 208 may receive the selection in the first region, the second region, or the third region of the pathway.

At block 510, the control system 208 may detect the presence of the user in third region of the walkway. The control system 208 may detect the user in response to data received from one or more sensors indicating that the user, or a portion thereof, has entered the third region of the walkway.

At block 512, the control system 208 may transmit one or more control signals to the environmental system 210 and/or the special effects system 304 to trigger one or more respective operations as described herein in response to detecting the presence of the user in the third region of the walkway. For example, the environmental system 210 may display the transportation illusion associated with the user based on the one or more control signals generated at block 508. The environmental system 210 may transmit a first control signal to the environmental output device 312 to provide a projection screen of physical material (e.g., fog, water, smoke, sand, ice, or cryogenic materials) in the third region, a second control signal to one or more video output devices (e.g., projectors) to present one or more images associated with the transportation illusion on the projection screen, a third control signal to one or more audio output devices (e.g., speakers) to present audio associated with the transportation illusion, or a combination thereof. In this way, the environmental system 210 may provide a transportation illusion associated with the user that may be seen and/or heard by one or more viewers.

Additionally, the special effects system 304 may trigger one or more special effects 310 (e.g., sensory effects) associated with the transportation illusion based on the one or more control signals generated at block 508. That is, the special effects 310 or sensory effects may provide the user with various sensory stimulations associated with a particular characteristic of the transportation illusion (e.g., olfactory, heat, wind, cold, haptics, or auditory). In some embodiments, the special effects 310 or the sensory effects may be provided to the user simultaneously or substantially simultaneously as the transportation illusion provided by the environmental illusion to the viewer. In this way, the user may feel as though the user is being transported to another location as the user walks through the third region while a viewer sees the likeness of the user being transported away. Accordingly, the special effects visualization system 202 may simultaneously (or substantially simultaneously) enhance the experience of the user and the experience of the viewer with the transportation illusion by providing an immersive and/or transformative experience to both the user and the viewer.

At block 514, the control system 208 may determine if the user is still in the third region of the pathway. For example, the control system 208 may detect the presence of the user based on data received from sensors indicating that the user, or a portion thereof, is still in the third region of the pathway. If the control system 208 determines that the user is still in the third region of the pathway, the process 500 may proceed back to block 512 and the transportation illusion may continue being produced by the environmental system 210 and/or the special effects system 304. If the control system 208 determines that the user is no longer in the third region of the pathway, the control system 208, at block 518, may transmit one or more control signals to the environmental system 210 and/or the special effects system 304 to cease providing the transportation illusion associated with the user at block 516. In some embodiments, the control system 208 may transmit the control signals to the environmental system 210 and/or the special effects system 304 after receiving a stop command signal from a computing system associated with the transportation illusion.

Additionally, certain operations may be performed to reduce or eliminate a residual special effect 310 or a physical material produced by the environmental output device 312 in the third region. For example, the special effects visualization system 202 may operate to eliminate or reduce residual mists, fog, water, smoke, sand, ice, cryogenic materials or other particulate materials from the third region to provide a subsequent user and/or a subsequent viewer a neutral initial experience to the transportation illusion. In this way, a subsequent user and/or a subsequent viewer may not experience residual visual, audio, or sensory effects associated with a previous transportation illusion.

After the transportation illusion associated with the user has stopped and any residual effects minimized, the process 500 may optionally return to block 502 and repeat for a subsequent user and/or viewer of the transportation illusion.

In some embodiments, additional components, such as mirrors or other reflective surfaces, may be included within or adjacent to the special effects visualization system 202 to hide, conceal, enhance, distort or duplicate components of the special effects visualization system 202. In this way, the special effects visualization system may be concealed from the user while the user is traveling through along the pathway. Concealing one or more of the special effects visualization system 202 may improve a user experience relative to not concealing the devices.

In some embodiments, facial recognition, voice recognition, content curation (e.g., speech-to-text, text-to-speech), and/or speech detection for censoring of content (e.g., slang or foul language prevention) may also be used to enhance user experiences. Additionally, one or more sensors have been described herein; however, it should be understood that any suitable sensor may be used in the special effect visualization system 202 to provide an immersive and/or transformative experience with the transportation illusion including thermal sensors, spatial sensors, ultrasonic sensors, infrared sensors, or the like.

With the foregoing in mind, technical effects of the present disclosure include improvements to visualization systems by improving an ability of a visualization system to provide an immersive and/or transformative experience with a transportation illusion to a user and one or more viewers. The techniques described above may simultaneously (or substantially simultaneously) enhance the experience of the user and the experience of the viewer with the transportation illusion by providing an immersive and/or transformative experience to both the user and the viewer. That is, while a viewer is seeing the likeness of the user being transported in a transportation illusion in the third region of the pathway, the user may experience a feeling of being transported away via one or more sensory stimulations associated with the transportation illusion 104.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible, or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A special effects visualization system, comprising:

a capture system configured to generate a dataset associated with a user based on likeness data of the user at a first location;

an environmental system configured to display one or more images at a second location different from the first location, wherein the one or more images are generated using the dataset associated with the user;

a special effects system configured to trigger a special effect at the second location; and a control system communicatively coupled to the capture system, the environmental system, and the special effects system, wherein the control system is configured to:

detect a presence of the user at the second location; and in response to detecting the presence of the user at the second location:

transmit one or more control signals to the environmental system based on the dataset, wherein the one or more control signals are configured to cause the environmental system to display the one or more images at the second location after the user has traveled through the second location to a third location different from the second location; and transmit one or more additional control signals to the special effects system, wherein the one or more additional control signals are configured to cause the special effects system to trigger the special effect during display of the one or more images at the second location.

2. The special effects visualization system of claim 1, wherein the environmental system is configured to display the one or more images at the second location by providing a projection medium at the second location and displaying the one or more images on the projection medium.

3. The special effects visualization system of claim 2, wherein the projection medium comprises at least water, smoke, fog, ice, liquid nitrogen, liquid oxygen, or a combination thereof.

4. The special effects visualization system of claim 1, wherein the one or more images are generated by modifying the likeness data of the dataset to at least stretch, disperse, or fade a likeness of the user transported away from the second location.

5. The special effects visualization system of claim 1, wherein the one or more images present a likeness of the user.

6. The special effects visualization system of claim 1, wherein the one or more images comprise a three-dimensional (3D) representation of the user.

7. The special effects visualization system of claim 1, wherein the control system is configured to extract identifiable features in the likeness data associated with the user and wherein the one or more images are generated based on the extracted identifiable features.

8. The special effects visualization system of claim 1, wherein the special effect comprises at least an olfactory, heat, wind, cold, haptic, auditory effect, or a combination thereof.

9. The special effects visualization system of claim 1, wherein the likeness data comprises at least volumetric data, depth data, spatial data, motion data, visual data, or shape data.

10. The special effects visualization system of claim 1, wherein the capture system is configured to acquire the likeness data of the user in response to the control system detecting the presence of the user at the first location.

11. The special effects visualization system of claim 1, wherein the control system is configured to adjust a configuration of a physical set comprising the first location, the second location, or both.

12. The special effects visualization system of claim 1, wherein the second location comprises an entrance or an exit to a room.

13. A special effects visualization system, comprising:

a capture system configured to acquire likeness data of a user at a first location and generate a dataset based on the likeness data;

an environmental system configured to display a three-dimensional (3D) presentation based on the dataset at a second location different from the first location after the user has traveled through the second location to a third location different from the second location, wherein the 3D presentation comprises a likeness of the user; and a special effects system configured to trigger a special effect at the second location during the display of the 3D presentation.

14. The special effects visualization system of claim 13, comprising a sensor configured to detect a presence of the user at the second location, wherein the environmental system is configured to display the 3D presentation and the special effects system is configured to trigger the special effect after the sensor has detected the presence of the user at the second location.

15. The special effects visualization system of claim 14, wherein the environmental system is configured to actuate a moveable wall to permit passage of the user away from the second location during the display of the 3D presentation.

16. The special effects visualization system of claim 14, wherein the sensor comprises a thermal sensor, a spatial sensor, an ultrasonic sensor, an infrared sensor, a pressure sensor, or any combination thereof.

17. The special effects visualization system of claim 13, wherein the 3D presentation comprises at least particles, smoke, fire, or a combination thereof.

18. The special effects visualization system of claim 13, wherein the special effect comprises an olfactory, heat, wind, cold, haptic, auditory effect, or a combination thereof.

19. The special effects visualization system of claim 13, comprising a real time graphics engine configured to modify the dataset based on an identifier associated with the 3D presentation.

20. The special effects visualization system of claim 19, wherein the real time graphics engine is configured to modify the dataset to at least transform the likeness of the user.

21. A method, comprising:

acquiring, via a capture system, a dataset associated with a user at a first location, wherein the dataset comprises likeness data of the user;

detecting, via a control system, the user at a second location;

in response to detecting the user at the second location:

displaying at the second location, via an environmental system, one or more images generated from the dataset after the user has traveled through the second location to a third location different from the second location; and triggering, via a special effects system, a special effect during the displaying at the second location.

22. The method of claim 21, wherein displaying at the second location the one or more images generated from the dataset comprises providing a projection medium at the second location and displaying the one or more images on the projection medium.

23. The method of claim 22, wherein providing the projection medium comprises providing at least a water screen, a smoke screen, a fog screen, a mist screen, an ice screen, a liquid nitrogen screen, a liquid oxygen screen, a sand screen, or a combination thereof.

24. The method of claim 21, wherein triggering the special effect comprises triggering at least an olfactory, heat, wind, cold, haptic, auditory effect, or a combination thereof.

25. The method of claim 21, comprising:

tracking a position of the user at the second location or at the third location;

modifying the dataset based on the tracked position of the user; and displaying at the second location an additional image generated from the modified dataset.

* * * * *